Patented Nov. 18, 1924.

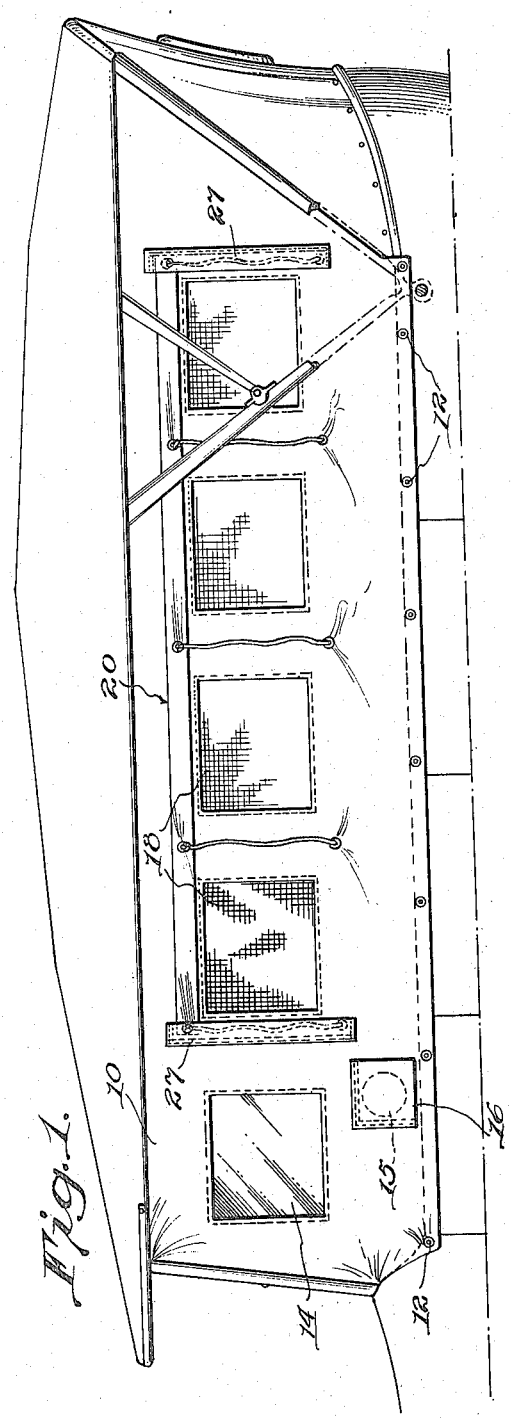
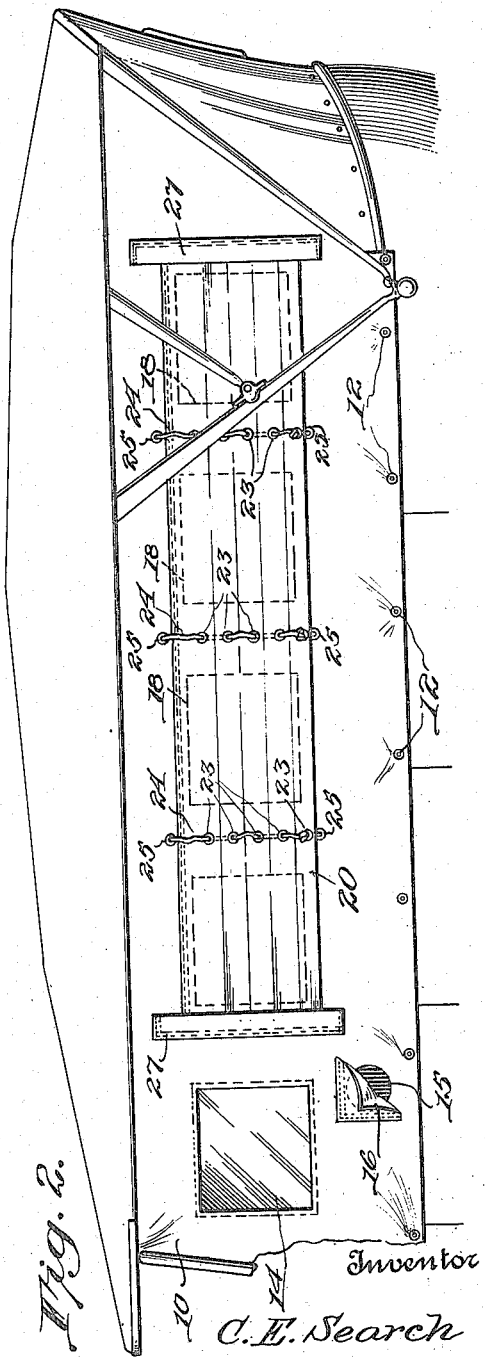

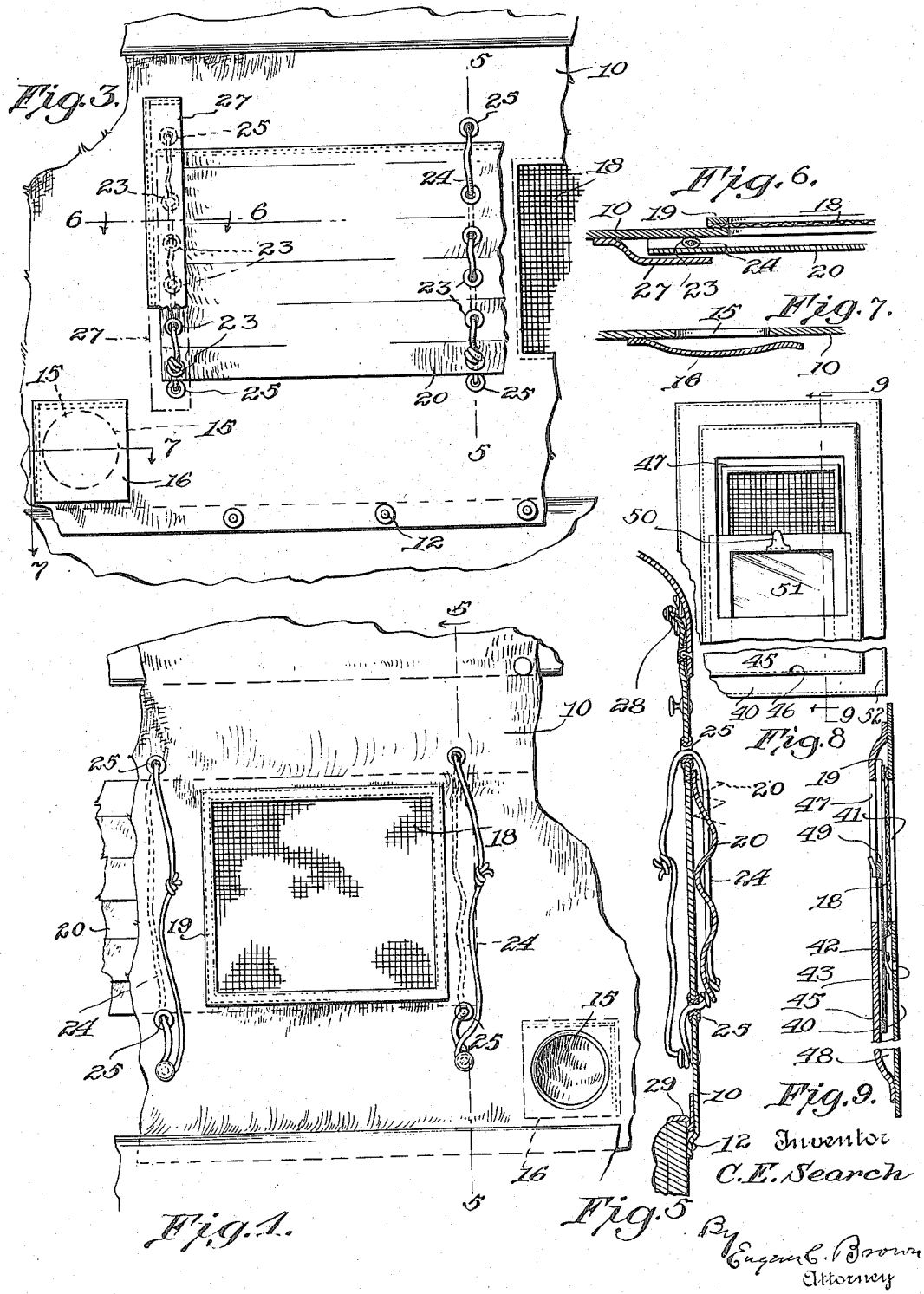

1,515,795

UNITED STATES PATENT OFFICE.

CHARLES EDW. SEARCH, OF MILWAUKEE, WISCONSIN.

VENTILATING CURTAIN FOR MOTOR VEHICLES.

Application filed March 6, 1922. Serial No. 541,452.

*To all whom it may concern:*

Be it known that I, CHARLES EDWIN SEARCH, a citizen of the United States, residing at Milwaukee, in the county of Milwaukee and State of Wisconsin, have invented certain new and useful Improvements in Ventilating Curtains for Motor Vehicles, of which the following is a specification.

This invention relates to curtains for vehicles and particularly to the curtains of the usual touring car type of automobiles, either as curtains in entirety or as window units to be sewed or otherwise attached to existing curtains so as to convert same so as to present the advantages of the present invention.

The main purpose of my invention is to provide a window opening in vehicle curtains which will not obscure the vision of the rider and will permit the air to pass therethrough while affording protection from insects and dust as well as from the direct force of the wind. I further provide a flexible fabric shutter or storm curtain flap on the outside which may by manipulation from within, be readily slid down over the window opening in case of rain or when other occasion requires it. I still further provide a transparency on the inside such as glass or celluloid that may be slid up over the window opening and yet not obscure the vision. An auxiliary feature of my invention is to provide soft fabric strips along the edge of the main curtain to be tucked in between same and the adjacent parts of the car to serve as packing to keep out wind, dust, mosquitos, etc.

In the following description, I shall refer to the accompanying drawings, in which—

Figures 1 and 2 are side elevations of the top portion of an automobile showing a curtain embodying my invention with a plurality of windows therein and a common storm flap or shutter in open and in closed positions, respectively; Fig. 3 is a fragmentary enlarged side elevation of the forward portion of the said curtain; Fig. 4 is a fragmentary enlarged side elevation showing an interior view of the same; Fig. 5 is a vertical sectional view on the line 5—5, of Figs. 3 and 4; Figs. 6 and 7 are enlarged detail views on the lines 6—6 and 7—7, respectively of Fig. 3; Fig. 8 is a fragmentary enlarged elevation of a window unit from the side corresponding to the interior when in place, the said unit being adapted to be sold as an article of manufacture for sewing or otherwise attaching to existing curtains; Fig. 9 is a central vertical sectional view of said window unit.

The side curtains 10 are of the usual removable type of waterproof fabric secured to the automobile top and body by means of buttons or snap fasteners 12. The forward portion is provided with one or more of the usual celluloid windows 14. I also provide a hand-hole 15, covered by a flap 16, at the side of the front seat, through which the driver may pass his hand to signal or for other purposes. The flap 16 is fastened to the curtain along its upper and front edges.

The ventilating windows in this embodiment of the invention are arranged at intervals and are covered with a screen material 18 applied to the inner side of the curtain and secured at the marginal edges between a binding strip 19 and the curtain material. The screens are preferably formed of fine wire mesh, though in some cases it may be desirable to make them of mosquito netting or other fabric.

For the purpose of closing the windows in inclement weather and when it is extremely cold, I provide a curtain shutter or flap 20, which may be constructed of the same material as the main curtains. This shutter may be wide enough to coact with the entire set of windows or it may evidently be of sufficient width to coact with only one or with fewer than all of the windows. It is secured along the top edge to the main curtain and is provided with eyelets or grommets 23 through which the adjusting cords 24 are threaded. These cords are located on both sides of each window, there being but one between adjacent windows. After threading each cord through eyelets 24, its ends are tied together so that the cord becomes continuous. Both side edges of the curtain shutter are covered by strips 27 sewed at their top, bottom and outer edges to the main curtain to form pockets in which the side edges of the shutter slide. These strips 27 serve as weather guards as well as guides.

The corresponding eyelets 23 in the several vertical rows are positioned in horizontal alinement, so that the curtain shutter will fold into a series of overlapping pleats as it is raised, and as they reach the top, they may be turned edgewise, the ends being compacted in the upper part of the side pockets formed by the strips 27 and these strips yielding outwardly sufficiently to accommodate and hold them securely in place.

Strips 28, 29 of soft fabric such as flannel are secured along the upper and lower edges of the main curtain 10 and similar strips may be used at the front and rear edges, so as to be adapted to serve as packing material to be tucked in between the curtain and the top, and the car body or the wind shield and the rear enclosing fabric, respectively. This serves to keep out mosquitos and other insects and also dust.

The embodiment of my invention illustrated in Figs. 8 and 9 contemplates the manufacture of windows as units to be applied by sewing or otherwise to existing curtains so as to then derive from them the benefits of my invention. The unit is placed on the curtain either opposite the usual celluloid window or not, and after sewing thereto along the margin, the curtain is cut out just inside the seam. The unit may consist of the screened window thereinabove described with or without the curtain shutter, and if same is used it may be of the fabric type hereinabove described or it may be transparent and in that case is preferably located to be on the inner rather than the outer side of the curtain. This form is illustrated in these figures. A piece of fabric 40 is suitably formed with an opening 41 to serve as a window which is covered by screen 18 fastened in place by binding strip 19. A leather sill 42 is sewed to the fabric 40 so as to form an upwardly opening recess. A water drain opening 43 is formed in the fabric 40 at the bottom of the recess. A smaller piece of fabric 45 is sewed along its edges by stitching 46 to the inner side of the piece of fabric 40 and has an opening 47 cut therein so as to be opposite opening 41. A pocket 48 is thus formed between the pieces of fabric 40, 45. A window frame 49 is made to slide within the pocket 48 and has secured thereto a flap 50 of leather for convenient manipulation. The frame 49 carries a transparency 51. The window frame may be constructed conveniently of a rectangular wire form around which is sewed a strip of leather projecting inwardly and at the same time sewing in the transparency which may be celluloid, or it may be otherwise constructed so as to use a transparency of glass. The window units can be sewed along their edges by stitching 52 to existing curtains. It probably will be more desirable to make use of the form of window shutter of this modification instead of the flexible type heretofore described, when making main curtains originally.

The construction of my ventilated side curtains and the manner of using the curtain shades will be understood from the foregoing description of structural parts. Ordinarily in pleasant weather, the curtain shades will be raised and folded in the manner indicated in Figs. 1 and 5, leaving the windows open. The screens not only exclude dust, flies and insects while providing ventilation and free circulation of air, but also serve as a protection from wind. Furthermore, they do not interfere with the vision from within. My screened window construction, therefore, gives to the touring car many of the additional advantages of the closed car. The sliding curtain shutters cooperates with the screened windows in adapting the car to all weather conditions, being ready at any instant to be raised or lowered from the inside of the car.

The form of window and sliding shutter shown in Figs. 8 and 9 can be even more conveniently operated from the inside by sliding same up into closed position resting on the sill 42 or down into open position resting within pocket 48. They can, of course, be individually operated.

I claim:—

1. A side curtain for automobiles having a window therein, a netting or screen material extending over said window and secured at the margins to the curtain, and a curtain shutter slidably mounted to be moved over the window or withdrawn therefrom.

2. A side curtain for automobiles having a window therein, a netting or screen material extending over said window and secured at the margins to the curtain, guide devices located at the sides of said window, and a curtain shutter slidably mounted for movement to close or to open said window.

3. A side curtain for automobiles as set forth, a screened window therein, a shutter for said window, and pockets within which the sides of the curtain shutter slide to form a closure for said window.

4. As an article of manufacture, a window unit for attaching to an automobile curtain, comprising a fabric having a screened window opening and a pocket formed on its inner side, and a window shutter slidable in said pocket for closing or opening said window opening.

5. In combination, a motor-vehicle having a top, front, rear and side portions forming a complete enclosure within the vehicle, a permanently screened opening in a side portion and a shutter for said opening adjustable to vary the amount of screened opening.

6. A side curtain for automobiles as set forth, a permanently screened window therein, an inner shutter for said window adjustable to vary the amount of screened window opening, a sill forming an upwardly opening recess for the shutter, and a drain opening in the curtain at the bottom of the recess.

In testimony whereof I affix my signature.

C. EDW. SEARCH.